(12) United States Patent
Bandy et al.

(10) Patent No.: US 8,715,460 B2
(45) Date of Patent: May 6, 2014

(54) APPARATUS AND METHOD FOR REMOVING A CMP PAD FROM A PLATEN

(75) Inventors: John J. Bandy, Cambridge, VT (US); Graham M. Bates, Waterbury, VT (US); Jeffery A. Brigante, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/347,060

(22) Filed: Jan. 10, 2012

(65) Prior Publication Data

US 2013/0174987 A1    Jul. 11, 2013

(51) Int. Cl.
*B32B 38/10*    (2006.01)
(52) U.S. Cl.
USPC ............ 156/715; 156/714; 156/759; 156/764
(58) Field of Classification Search
None
See application file for complete search history.

(56) References Cited

U.S. PATENT DOCUMENTS

| | | | |
|---|---|---|---|
| 5,170,595 A | 12/1992 | Wiand |
| 5,551,136 A | 9/1996 | Bartlett |
| 6,036,586 A | 3/2000 | Ward |
| 6,221,199 B1 | 4/2001 | Chang et al. |
| 6,244,941 B1 | 6/2001 | Bowman et al. |
| 6,299,519 B1 | 10/2001 | Easter et al. |
| 7,125,326 B2 | 10/2006 | Walsh et al. |
| 7,222,403 B2 | 5/2007 | Tehrani |

*Primary Examiner* — Mark A Osele
*Assistant Examiner* — Nickolas Harm
(74) *Attorney, Agent, or Firm* — Schmeiser, Olsen & Watts; Anthony J. Canale

(57) ABSTRACT

A method and apparatus for removing a pad adhesively secured to a platen. The apparatus includes a barrel assembly having a clamp assembly fixedly attached to a perimeter of the barrel assembly; a rotatable handle assembly nested within the barrel assembly; and a ratchet assembly nested between the handle assemble and the barrel assembly the ratchet assembly configured to engage the rotatable handle assembly.

20 Claims, 11 Drawing Sheets

APPARATUS AND METHOD FOR REMOVING A CMP PAD FROM A PLATEN

FIELD OF THE INVENTION

The present invention relates to the field of chemical-mechanical polishing (CMP); more specifically, it relates to an apparatus for removing a pad from a platen and a method for removing a pad from a platen.

BACKGROUND

CMP is a process by which a substrate is placed against a rotating polishing pad while abrasive slurry is applied to the pad in order to etch/polish the substrate flush. Because of the forces involved the pad is adhesively (but removeably) secured to the platen making removal difficult. Because of the large size of the pad and strength of the adhesive various pad removal tools have been proposed. However, they do not work on CMP tools having recessed platens, must be attached to the CMP tool or present difficulties in removing the pad from the pad removal tool. Accordingly, there exists a need in the art to eliminate the deficiencies and limitations described hereinabove.

SUMMARY

A first aspect of the present invention is an apparatus, comprising: a barrel assembly having a clamp assembly fixedly attached to a perimeter of the barrel assembly; a rotatable handle assembly nested within the barrel assembly; and a ratchet assembly nested between the handle assembly and the barrel assembly, the ratchet assembly configured to engage the handle assembly.

A second aspect of the present invention is a method of removing a pad that is adhesively secured to a platen from the platen, comprising: placing a pad removal tool on the pad, the pad removal tool comprising: a barrel assembly having a clamp assembly fixedly attached to a perimeter of the barrel assembly; a rotatable handle assembly nested within the barrel assembly; and a ratchet assembly nested between the rotatable handle assembly and the barrel assembly, the ratchet assembly configured to engage the rotatable handle assembly; aligning the clamp assembly, the barrel assembly, the ratchet assembly and the rotatable handle assembly along a line passing through a center of the pad; clamping an edge of the pad in the clamp assembly; using the handle and the ratchet assembly, applying a force in a direction parallel to the line to rotate the barrel assembly in the direction and to roll a less than whole portion of the polishing pad onto the barrel assembly; and completely removing the pad from the platen.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

DETAILED DESCRIPTION

Figure 1:
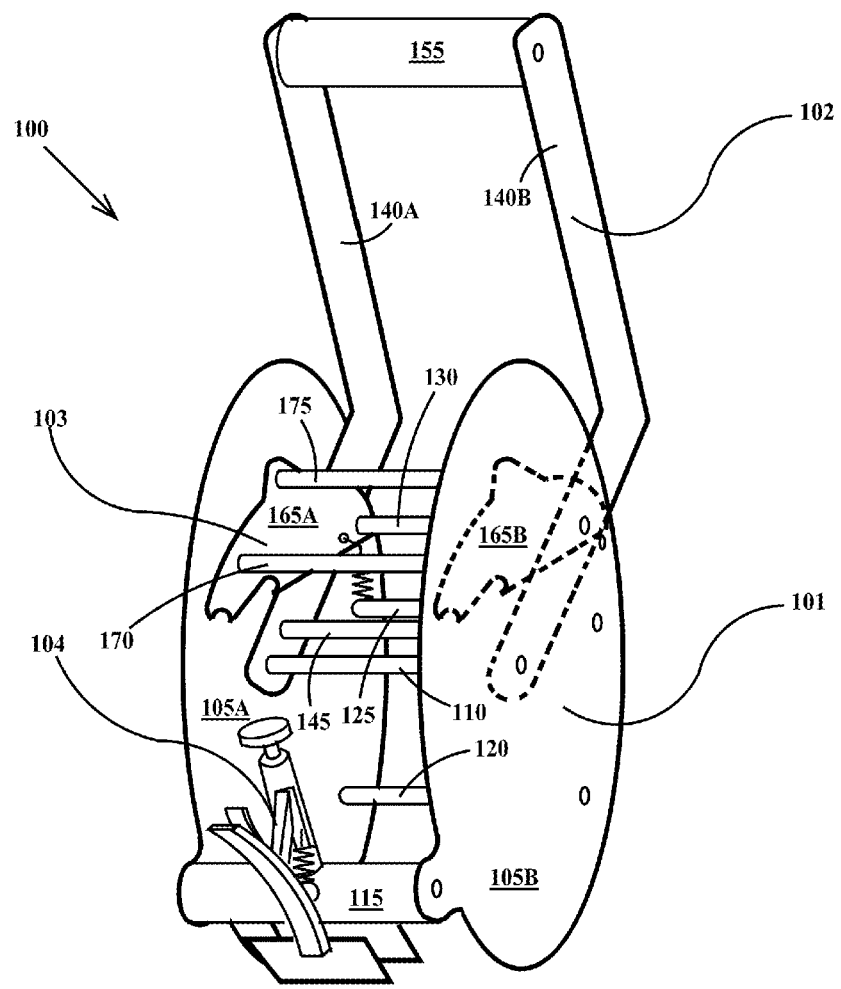
FIG. 1 is an isometric view of an apparatus for removing an adhesively secured pad according to an embodiment of the present invention.

FIG. 1 is an isometric view of an apparatus for removing an adhesively secured pad according to an embodiment of the present invention. In FIG. 1, pad removal tool 100 includes a barrel assembly 101, a handle assembly 102, a ratchet assembly 103 and a clamp assembly 104. Barrel assembly 101 includes a side plate 105A and an opposite and similar side plate 105B having major surfaces facing each other and fixedly connected by rods 110, 115, 120, 125 and 130. Handle assembly 102 includes an L-shaped arm 140A and an opposite and similar L-shaped arm 140B having major surfaces facing each other and fixedly connected by rods 145 and a handle 155. Each L-shaped arm has a first member extending inside of barrel assembly 101 and a second member extending outside of barrel assembly 101. Ratchet assembly 103 includes a ratchet plate 165A and an opposite and similar ratchet plate having major surfaces facing each other and fixedly connected by rods 170 and 175. Handle assembly 102 is nested within barrel assembly 101 and ratchet assembly 103 is nested within handle assembly 102. Because rods 170 and 175 do not extend past ratchet plates 165A and 165B, arms 140A and 140B are free to move between ratchet assembly 103 and barrel assembly 101.

In one example, rods 110, 115, 120, 125, 130, 145, 170 and 175 are fabricated from stainless steel and side plates 105A and 105B, arms 140A and 140B, and ratchet sides 140A and 140B are fabricated from anodized aluminum reducing weight. In one example, clamp assembly 104 may be fabricated from commercially available locking pliers, such as Vise-Grip™ (i.e., model 8R) manufactured by Irwin Industrial Tool Company of Huntsville, N.C.

Figure 2:
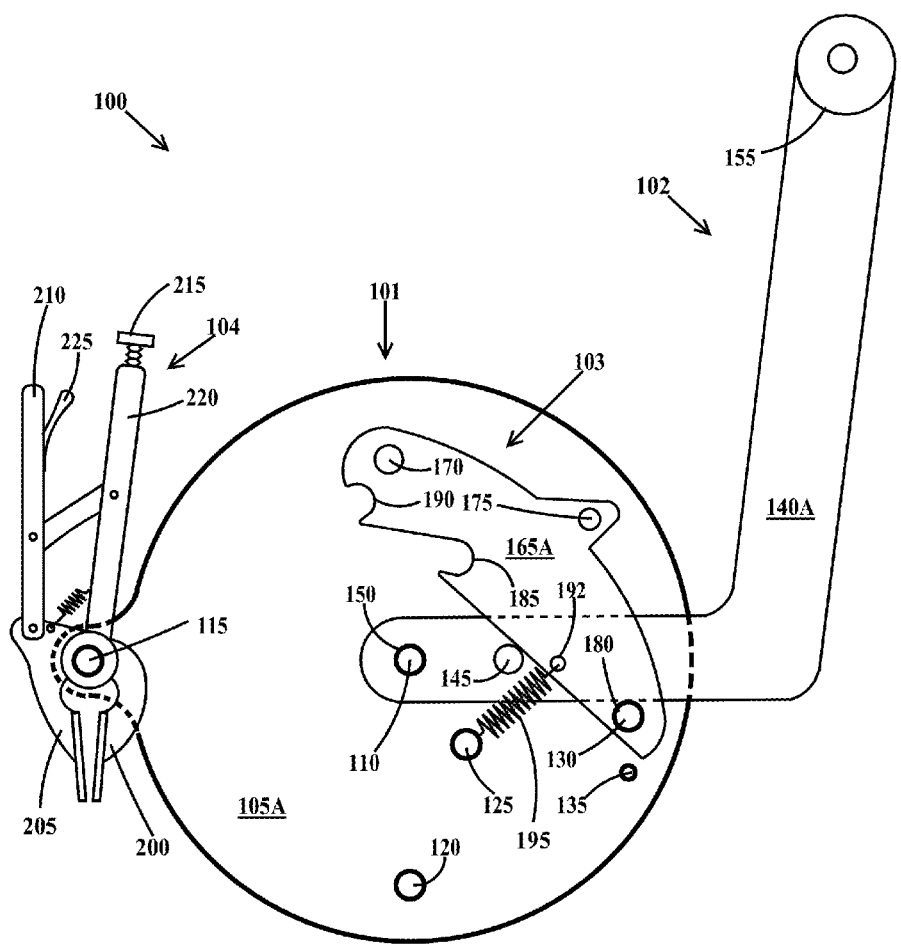
FIG. 2 is an internal view of the apparatus of FIG. 1 illustrating the various components of the apparatus in more detail.

FIG. 2 is an internal side view of the apparatus of FIG. 1 illustrating the various components of the apparatus in more detail. In FIG. 2, side plate 105A is attached to the aforementioned rods 110, 115, 120, 125 and 130 and includes a stop pin 135. Arm 140A is attached to the aforementioned rod 145 and handle 155 and further includes a hole 150 through which rod 110 passes. Thus, arm 140A is free to rotatable about rod 110, but is stopped from 360° rotation by rod 130 on which arm 140A is shown resting on. Ratchet plate 165A is attached top the aforementioned rods 170 and 175 and includes a hole 180 through which rod 130 passes. Thus, ratchet plate 165A is free to rotate about rod 130, but is stopped from 360° rotation by rod 145 on which ratchet plate 165A is shown resting on and by a pin 135 in side 105A. Ratchet plate 165A also includes a first notch 185 closet to hole 180 and a second notch 190 furthest from hole 180. A hole 192 in ratchet plate 165A allows connection of a spring 195 between ratchet plate 165A and rod 125. Spring acts to hold ratchet plate 165A against rod 145.

An internal view toward side plate 105B, arm 140B and ratchet plate 165B (see FIG. 1) would present a minor image of FIG. 2 and include a second spring 195. Turning to clamp assembly 104 of FIG. 2, clamp assembly 104 includes a fixed jaw 200 fixedly attached to rod 115 and a movable jaw 205 rotatable about rod 115. Movable jaw 205 is moved toward fixed jaw 200 by a handle 210 that is hinged to movable jaw 205. An adjustment screw 215 in a handle 220 (that is also fixedly attached to rod 115) allows adjustment of the clamping force between fixed jaw 200 and movable jaw 205. A lever 225 in handle 210 allows the clamping force to be released.

Figure 3:
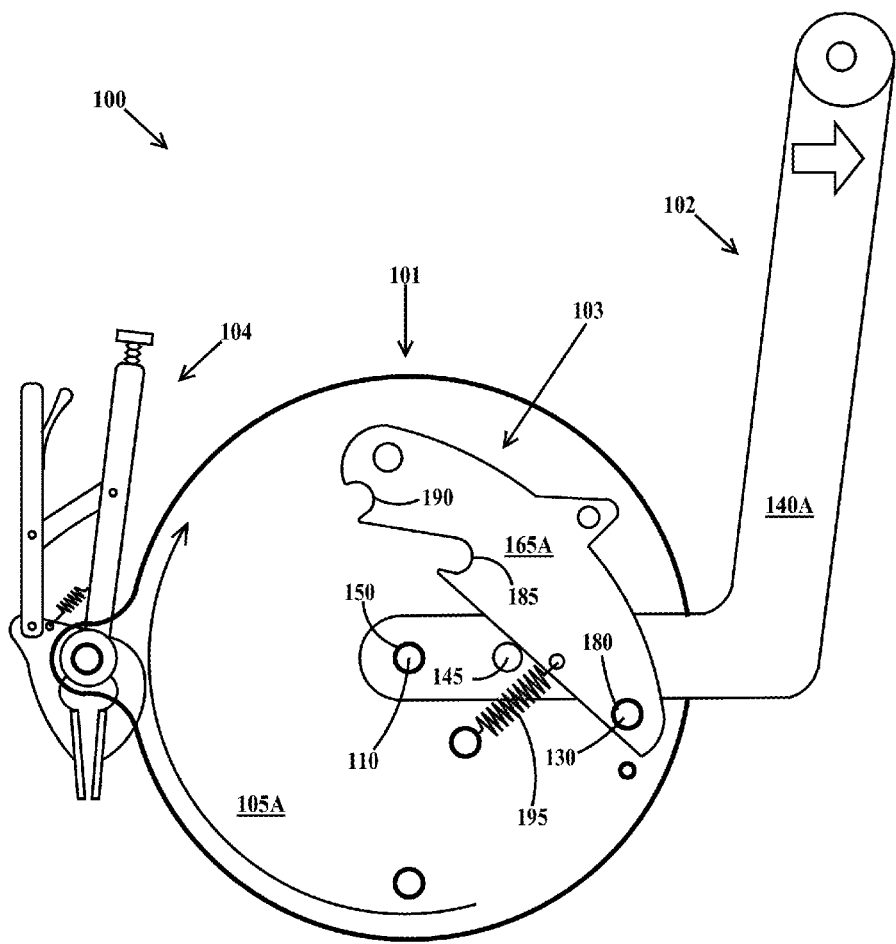
FIG. 3 is an internal side view of the apparatus of FIG. 1 illustrating a first position of the ratchet mechanism.

FIG. 3 is an internal side view of the apparatus of FIG. 1 illustrating a first position of the ratchet mechanism. FIG. 3 is similar to FIG. 2 except the dashed lines have been removed and some of the reference numerals to more clearly show the interaction of handle assembly 102 with ratchet assembly 103. It should be understood that the positions and movements of arm 140A and ratchet plate 165A are duplicated by 140B and ratchet plate 165B (not shown). In the first position, arm 140A rests on rod 180 and a bottom edge of ratchet plate 165A between first notch 185 and hole 180 rests against rod 145. Moving handle assembly 102 in the direction indicated on arm 140A will cause a corresponding force on rod 130 causing the entire pad removal tool 100 to rotate about rod 110 in the clockwise direction indicated on side plate 105A.

Figure 4:
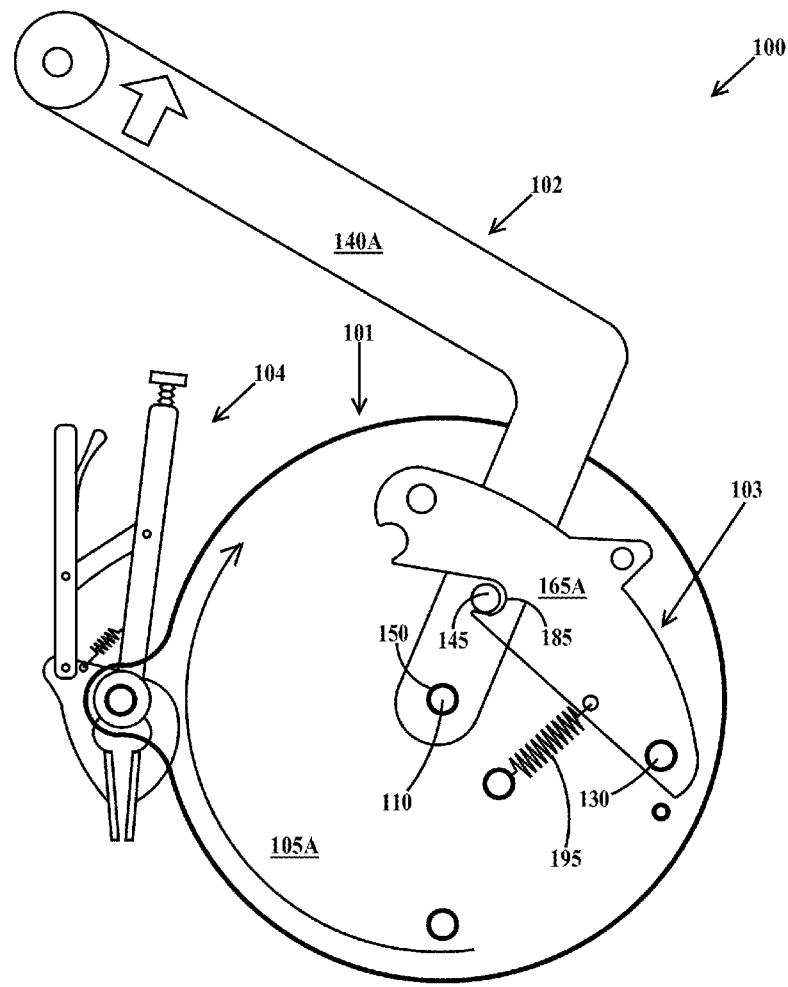
FIG. 4 is an internal side view of the apparatus of FIG. 1 illustrating a second position of the ratchet mechanism.

FIG. 4 is an internal view of the apparatus of FIG. 1 illustrating a second position of the ratchet mechanism. In FIG. 4, handle assembly 102 was rotated counter-clockwise about rod 110 while holding barrel assembly 101 in the same position as in FIG. 3 (i.e., while not rotating the barrel assembly) until rod 145 engages first notch 185 in ratchet plate 165A. Ratchet plate 165A has also rotated about rod 130 while arm 140A was rotated. Moving handle assembly 102 in the direction indicated on arm 140A will cause a corresponding force on rod 145 which is transmitted to rod 130 through ratchet plate 165A causing the entire pad removal tool 100 to rotate about rod 110 in the clockwise direction indicated on side plate 105A.

Figure 5:
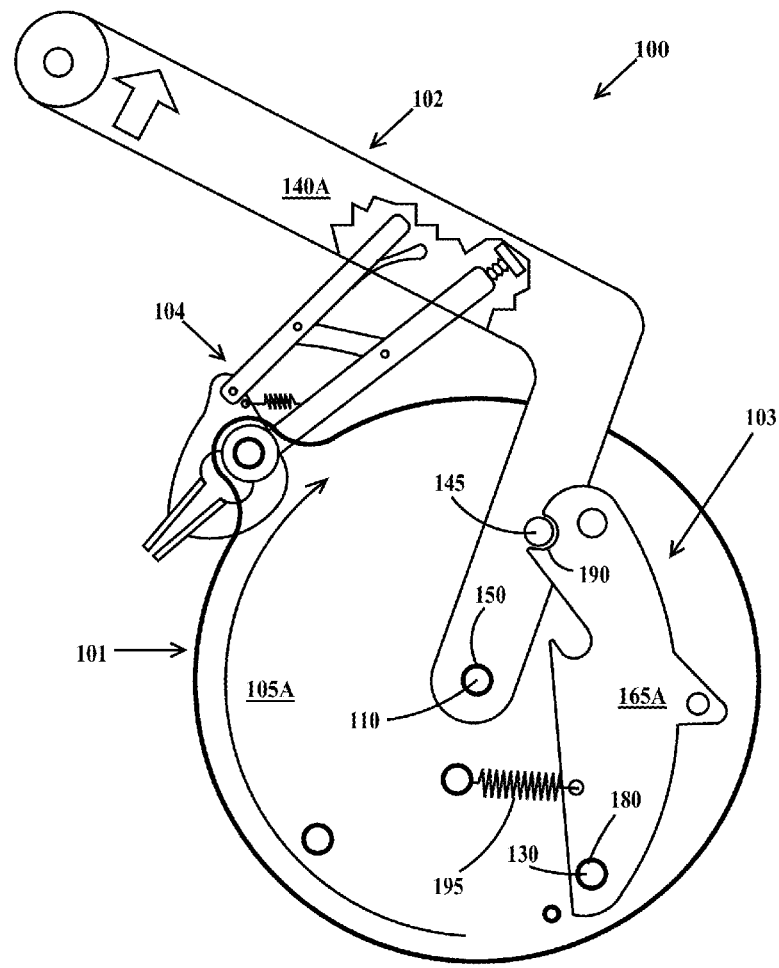
FIG. 5 is an internal side view of the apparatus of FIG. 1 illustrating a third position of the ratchet mechanism.

FIG. 5 is an internal side view of the apparatus of FIG. 1 illustrating a third position of the ratchet mechanism. In FIG. 5, handle assembly 102 was rotated counter-clockwise about rod 110 while holding barrel assembly 101 in the same position as in FIG. 4 (i.e., while not rotating the barrel assembly) until rod 145 engages second notch 190 in ratchet plate 165A. (Note the entire FIG. 5 has been rotated to fit on the drawing sheet.) Ratchet plate 165A has also rotated about rod 130 while arm 140A was rotated. Moving handle assembly 102 in the direction indicated on arm 140A will cause a corresponding force on rod 145 which is transmitted to rod 130 through ratchet plate 165A causing the entire pad removal tool 100 to rotate about rod 110 in the clockwise direction indicated on side plate 105A.

Figure 6:
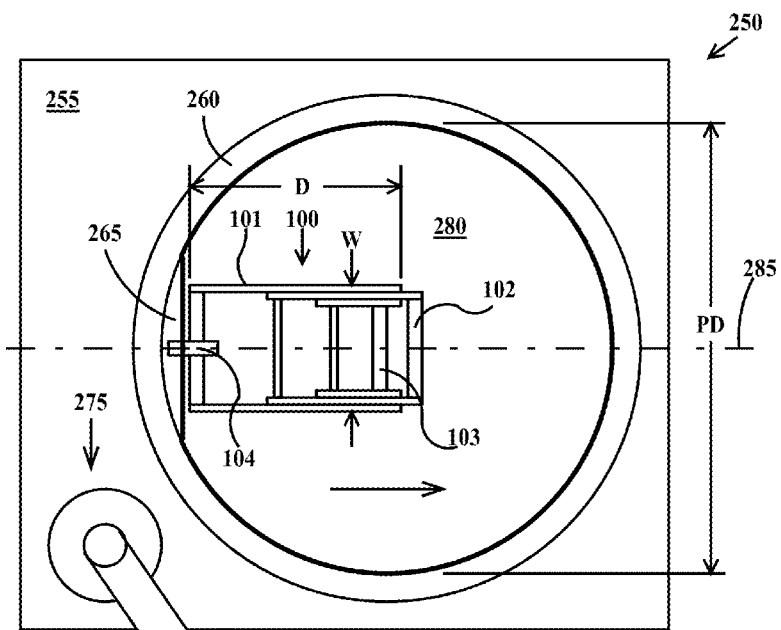
FIG. 6 is a top view of a CMP tool with the pad removal tool of FIG. 1 in a starting position.

FIG. 6 is a top view of a CMP tool 250 with the pad removal tool of FIG. 1 in a starting position. In FIG. 6, a CMP tool 250 includes a raised deck 255 around a well 260 with a platen 265 or polishing well positioned therein. Platen 265 can rotate around a center axis. CMP tool 250 also includes a polishing head 270 suspended from a moveable arm assembly 275 for holding and rotating circular wafers (the substrate used in semiconductor processing) that are pressed into a polishing pad 280 that is adhesively secured to platen 265. CMP tool 250 also includes means (not shown) for dispensing a chemical etchant and abrasive slurry onto polishing pad 280. CMP tool 250 may also includes means (not shown) for dispensing rinse solution onto polishing pad 280. In FIG. 6, arm assembly 275 is rotated out of the way preparatory to removing polishing pad 280. Pad removal tool 100 is placed centered along an axis 285 that passes through the center of platen 265 so as to eliminate or minimize rotational force on platen 265 during the pad removal process. The pad is to be removed in the direction indicated by the arrow.

Polishing pad 280 has a diameter PD. Pad removal tool 100 had a diameter D and a width W. It is preferred that W be selected to be wide enough to provide a stable footing (not easily tilted side to side) for barrel assembly 101 and yet be narrow enough to allow clamp assembly to be close (with a couple of inches) of the edge of polishing pad 280 (see FIG. 7A). It is preferred that W be selected to be large enough to have most of the removed pad wrapped around barrel assembly 101 after removal without the pad overlapping itself, yet be small enough to leave as little pad still attached to the platen as possible (see FIG. 7E). In one example, the ratio of W/PD is between about 0.20 and about 0.30 with about 0.25 preferred. In one example, the ratio of D/PD is between about 0.4 and about 0.6 with about 0.5 preferred. For polishing pads intended to CMP 200 mm diameter wafers PD is about 22 inches, making D about 10 inches and W about 5 inches. For polishing pads intended to CMP 300 mm diameter wafers PD is about 30 inches, making D about 15 inches and W about 7.5 inches.

Figure 7A:
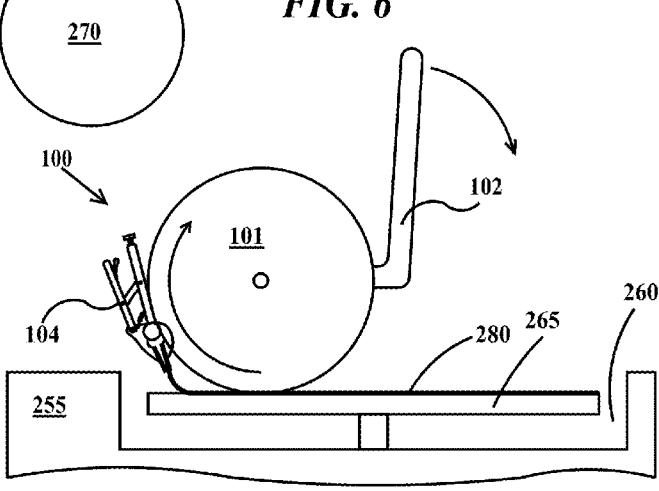
FIGS. 7A through 7G are side views illustrating the various steps in using the apparatus of FIG. 1 to remove a pad from a platen.

FIGS. 7A through 7G are side views illustrating the various steps in using the apparatus of FIG. 1 to remove a pad from a platen. The term "manually" is defined as a person using their hands to place the pad removal tool on the polishing pad, to grasp the polishing pad, to clamp the polishing pad, to apply a force to the handle of the pad removal tool by pulling or pushing on the handle of the pad removal tool, and to remove the pad removal tool from the CMP tool. In FIG. 7A, an edge of polishing pad 280 has been pulled up manually (about 10% of the total pad area) and manually clamped into clamp assembly 104. Pad removal tool 100 is internally set as illustrated in FIG. 2 and handle assembling 102 is manually pulled clockwise to rotate barrel assembly 101 in the clockwise direction. This results in the orientation of pad 280 and pad removal tool 100 shown in FIG. 7B.

Figure 7B:
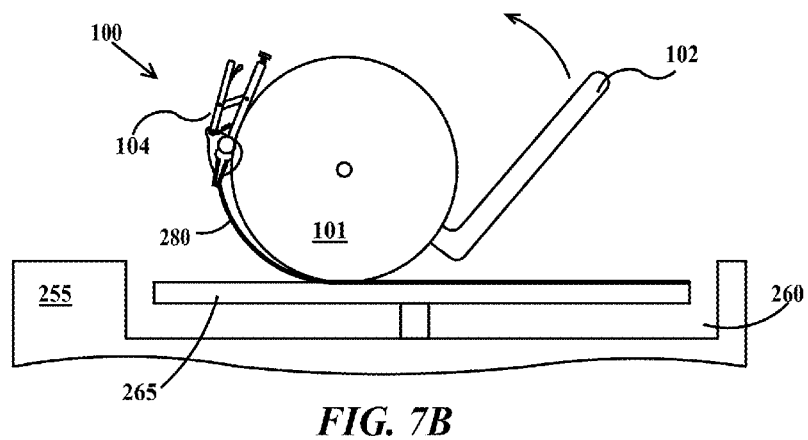

In FIG. 7B, about a 35% of the total pad area of polishing pad 280 has been pulled from platen 265 and wrapped on barrel 101 by manually pulling on handle 155 (see FIG. 1) of arm assembly 102. Pulling of arm assembly 102 has stopped prior to the arm assembly hitting polishing pad 265. Arm assembly 102 is then rotated counterclockwise to internally set pad removal tool 100 as illustrated in FIG. 4 (rod 145 is engaged in notch 185) by manually pushing on handle 155 (see FIG. 1) of handle assembly 101. This results in the orientation of pad 280 and pad removal tool 100 shown in FIG. 7C.

Figure 7C:
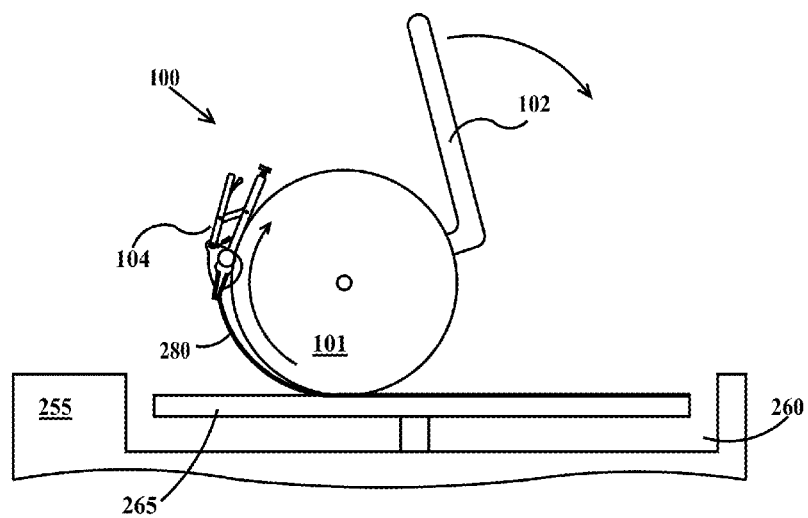
Figure 7D:
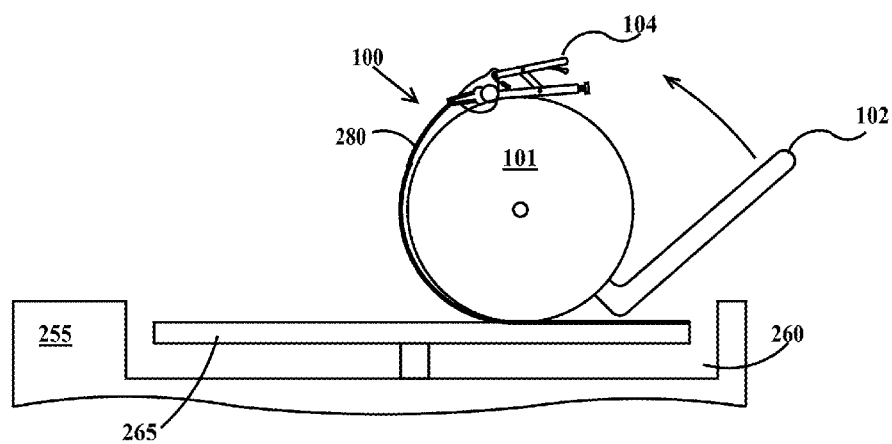

In FIG. 7C, handle assembly 102 is again manually pulled in the clockwise direction resulting in the orientation of pad 280 and pad removal tool 100 shown in FIG. 7D. In FIG. 7D, about 60% of the total area of polishing pad 280 has been pulled from platen 265 and wrapped on barrel 101. Pulling of arm assembly 102 has stopped prior to the arm assembly hitting polishing pad 265. Arm assembly 102 is then rotated counterclockwise to internally set pad removal tool 100 as illustrated in FIG. 5 (rod 145 is engaged in notch 190) by again manually pushing on handle 155 (see FIG. 1) of the handle assembly. This results in the orientation of pad 280 and pad removal tool 100 shown in FIG. 7E.

Figure 7E:
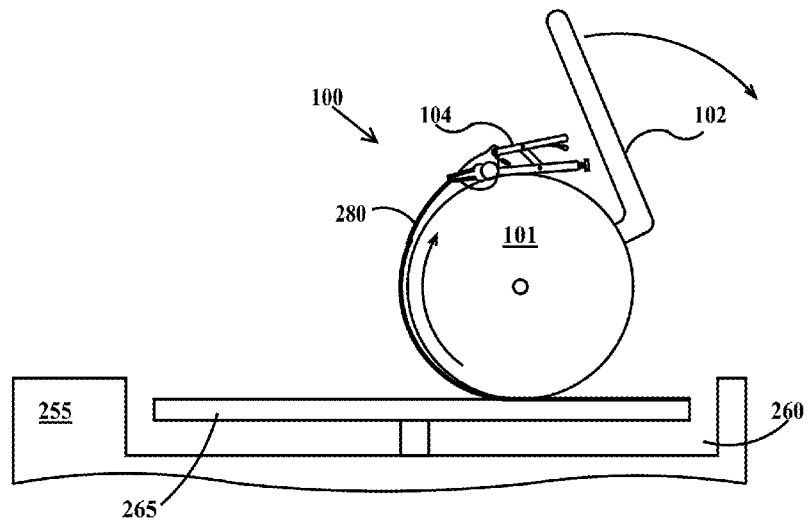
Figure 7F:
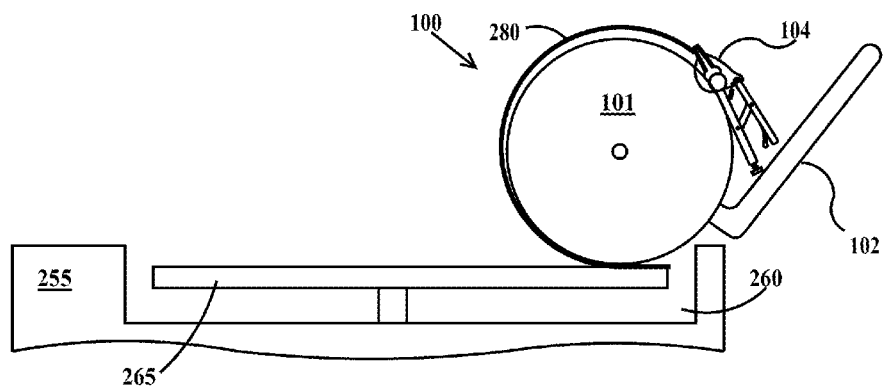
Figure 7G:
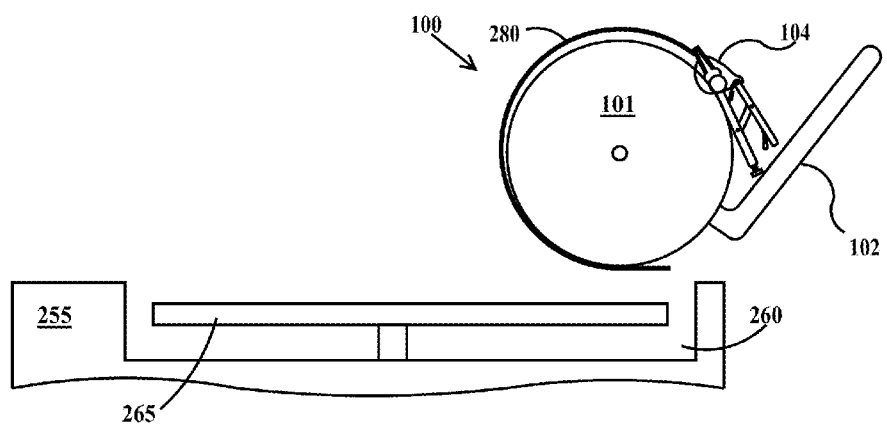

In FIG. 7E, handle assembly 102 is again manually pulled in the clockwise direction resulting in the orientation of pad 280 and pad removal tool 100 shown in FIG. 7F. In FIG. 7F, at least about 80% of the total area of polishing pad 280 has been pulled from platen 265 and wrapped on barrel 101. Pulling of arm assembly 102 has stopped prior to the arm assembly hitting polishing pad 265. The area of polishing pad 280 still attached to platen 265 is small enough to complete removal by simply manually lifting pad removal tool 100 and the attached polishing pad away from CMP tool 255 as illustrated in FIG. 7G. Alternatively, the pad may be unclamped, the pad removal tool removed, and the pad removed manually. Note, in FIG. 7G, polishing pad 280 is not completely wrapped around barrel assembly 101 and not wrapped around itself, making removal of polishing pad 280 from pad removal tool 100 easy.

Figure 8:
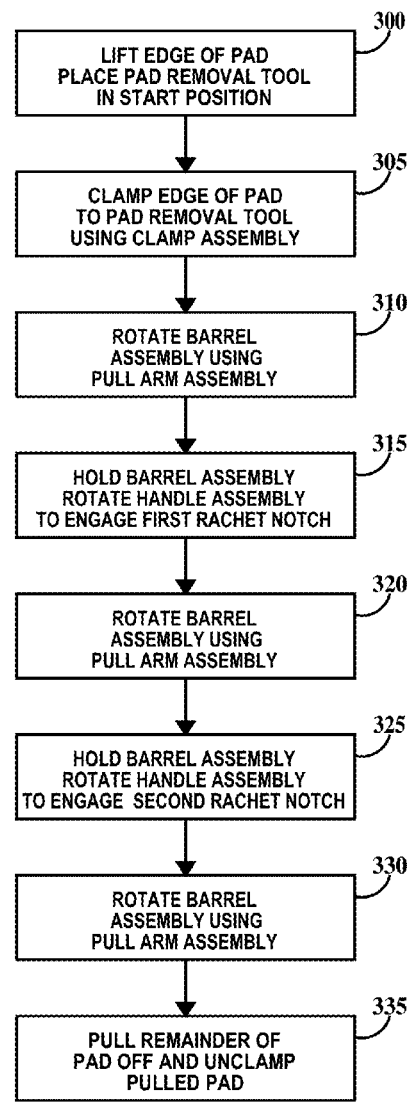
FIG. 8 is a flowchart of the steps to remove a pad from a platen according to an embodiment of the present invention.

FIG. 8 is a flowchart of the steps to remove a pad from a platen according to an embodiment of the present invention. In step 300, an operator raises the edge of the polishing pad from the platen and places the pad removal tool of the present invention placed on the polishing pad as illustrated in FIG. 6. In step 305, the operator clamps the pulled up edge of the polishing pad to the pad removal tool using the clamp assembly as in FIG. 7A. Internally, the ratchet assembly is set as in FIG. 3. In step 310, the operator rotates the barrel assembly in a first direction using the arm assembly as in FIG. 7B. In step 315, the operator rotates the arm assembly in a second direction opposite to the first direction as in FIG. 7C to set the ratchet assembly as in FIG. 4. In step 320, the operator rotates the barrel assembly in the first direction using the arm assembly as in FIG. 7D. In step 325, the operator rotates the arm assembly in the second direction as in FIG. 7E to set the ratchet assembly as in FIG. 5. In step 330, the operator rotates the barrel assembly in the first direction using the arm assembly as in FIG. 7E. In step 335, the operator lifts the pad removal tool from the polishing tool thus removing the remainder of the polishing pad from the plate as in FIG. 7G. Then the polishing pad is removed from the pad removal tool by releasing the clamp assembly.

Figure 9:
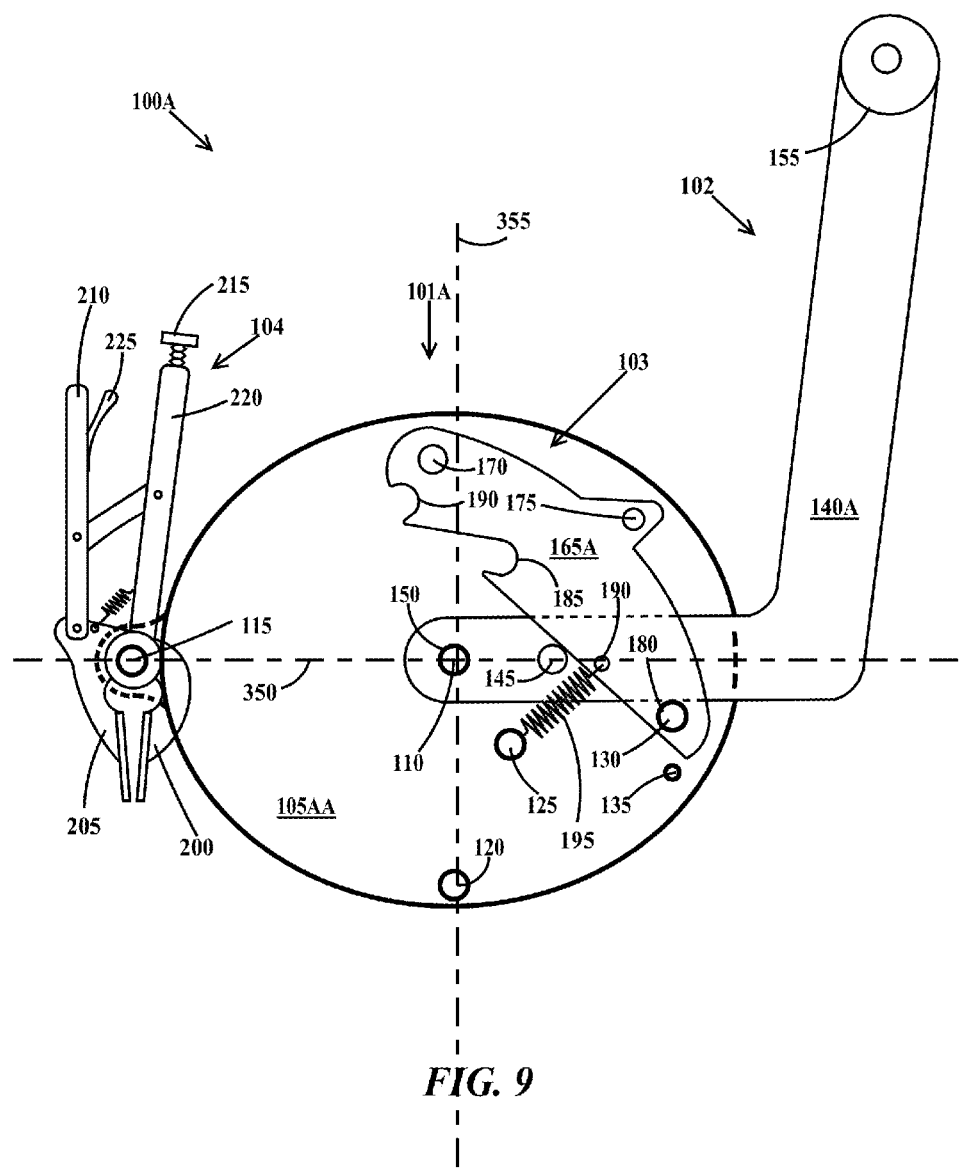
FIG. 9 is an internal view of an alternate embodiment of the present invention.

FIG. 9 is an internal view of an alternate embodiment of the present invention. In FIG. 9, a pad removal tool 100A is similar to pad removal tool 100 of FIG. 2 except a barrel assembly 101A includes oval (oval is defined to include elliptical) side plate 105AA and an opposite oval side plate 105BA (not shown). Rod 110 attaches the geometric center of side plate 105AA to the geometric center of side plate 105BA (not shown). Side plate 105AA has a major axis 350 and a minor axis 355. The width of side plate 105AA is greater along axis 350 then along axis 355. In a second alternative embodiment, side plate 105AA is rotated 90° without rotating any other elements of FIG. 9 so the positions of the major and minor axes are exchanged.

While the ratchet assembly has been illustrated having three positions (and two notches), the ratchet assembly may have more than three positions (and more than two notches).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of removing a pad that is adhesively secured to a platen from the platen, comprising:
   placing a pad removal tool on said pad, said pad removal tool comprising:
      a barrel assembly having a clamp assembly fixedly attached to a perimeter of said barrel assembly;
      a rotatable handle assembly nested within said barrel assembly; and
      a ratchet assembly nested between a portion of said rotatable handle assembly that is nested within said barrel assembly, said ratchet assembly configured to engage said rotatable handle assembly;
   aligning said clamp assembly, said barrel assembly, said ratchet assembly and said rotatable handle assembly along a line passing through a center of said pad;
   clamping an edge of said pad in said clamp assembly;
   using said handle assembly and said ratchet assembly, applying a force in a direction parallel to said line to rotate said barrel assembly in said direction and to roll a less than whole portion of said pad onto said barrel assembly; and
   completely removing said pad from said platen.

2. The method of claim 1, including:
   manually lifting a region of said pad from said platen to facilitate said clamping an edge of said pad in said clamp assembly.

3. The method of claim 1, wherein said applying a force in a direction parallel to said line to rotate said barrel assembly in said direction and to roll a less than whole portion of said pad onto said barrel assembly includes:
   manually moving said handle along said line and away from said clamp to rotate said barrel assembly;
   manually moving said handle along said line and toward said clamp while not rotating said barrel assembly to engage said ratchet assembly;
   manually moving said handle along said line and away from said clamp to rotate said barrel assembly while said ratchet assembly is engaged; and
   repeating said manually moving said handle along said line and toward said clamp while not rotating said barrel assembly to engage said ratchet assembly and said manually moving said handle along said line and away from said clamp to rotate said barrel assembly while said ratchet assembly is engaged multiple times, each time, a different region of said ratchet assembly is engaged by said handle.

4. The method of claim 1, wherein between said using said handle assembly and said ratchet assembly, applying a force in a direction parallel to said line to rotate said barrel assembly in said direction and to roll a less than whole portion of said pad onto said barrel assembly and said completely removing said pad from said platen, at least about 80% of the total area of said pad is removed from said platen.

5. The method of claim 1, wherein said completely removing said pad from said platen includes:
   lifting said pad removal tool away from said platen to completely remove said pad from platen while said pad is still clamped in said clamp assembly.

6. The method of claim 1, wherein said completely removing said pad from said platen includes:
   unclamping said pad from said clamp assembly;
   lifting said pad removal tool away from said platen;
   manually removing any of said pad still attached to said platen from said platen.

7. The method of claim 1, wherein said pad is a circular pad and said platen is a platen of a chemical-mechanical-polish tool.

8. The method of claim 7, wherein said platen and said pad are recessed below a top surface of said chemical-mechanical-polish tool.

9. The method of claim 1, wherein said barrel assembly comprises:
circular or oval first and second plates having major surfaces arranged parallel to each other and fixedly connected to each other by multiple rods.

10. The method of claim 1, wherein said pad is flat and circular and a ratio of a diameter of said barrel assembly to a diameter of said pad is between about 0.4 and about 0.6 and a ratio of a width of said barrel assembly and said diameter of said pad is between about 0.20 and about 0.30.

11. The method of claim 1, wherein said clamp assembly is completely external to said barrel assembly.

12. The method of claim 1, wherein said ratchet assembly is configured to engage said handle assembly in at least three different positions.

13. The method of claim 1, wherein said barrel assembly comprises:
circular or oval first and second plates having major surfaces arranged parallel to each other;
a first rod connecting geometric centers of said first and second plates;
a second rod attaching said first and second plates at opposite first respective points proximate to perimeters of said first and second plates; and
a third rod attaching said first and second plates at opposite second respective points proximate to perimeters of said first and second plates, said first rod between said second rod and said third rod.

14. The method of claim 13, wherein said handle assembly comprises:
L-shaped first and second arms having first and second elongated members, said arms arranged parallel to each other, said first rod passing through respective holes in ends of said first members;
a fourth rod attaching said first members of said first and second arms.

15. The method of claim 14, wherein said ratchet assembly comprises:
first and second ratchet plates having and first and second ends and having major surfaces arranged parallel to each other, said first and second ratchet plates having respective first and second notches and a respective surface connecting said first notch to said first end, said third rod passing through holes in said first ends of said first and second ratchet plates.

16. The method of claim 15, wherein:
in a first position, said surface connecting said first notch to said first end rests on said fourth rod:
in a second position said fourth rod is engaged by said first notches; and
in a third position said fourth rod is engaged by said second notches.

17. The method of claim 15, wherein said handle assembly is configured to engage notches in said ratchet assembling when moved in a first direction away from said clamp assembly and disengage said notches when moved a second direction toward said clamp assembly.

18. The method of claim 13, wherein said clamp assembly comprises:
a first jaw fixed to said second rod;
a second jaw movable about said second rod; and
means for applying clamping force between said first jaw and said second jaw.

19. The method of claim 1, wherein a diameter of said barrel assembly is large enough to wrap a least 80% of a total area of said pad around said barrel assembly without said pad overlapping.

20. The method of claim 1, wherein said handle assembly is positioned over said pad during rolling of said pad onto said barrel assembly.

* * * * *